USOO5881379A

United States Patent [19]
Beier et al.

[11] Patent Number: 5,881,379
[45] Date of Patent: Mar. 9, 1999

[54] SYSTEM, METHOD, AND PROGRAM FOR USING DUPLICATED DIRECT POINTER SETS IN KEYED DATABASE RECORDS TO ENHANCE DATA RECOVERABILITY WITHOUT LOGGING

[75] Inventors: Harley Al Beier, Morgan Hill; Sidney Kornelis, Cupertino; Vern L. Watts, Los Altos, all of Calif.

[73] Assignee: International Business Machines Corporation, Armonk, N.Y.

[21] Appl. No.: 650,702

[22] Filed: May 20, 1996

[51] Int. Cl.⁶ .................................................. G06F 17/30
[52] U.S. Cl. .......................... 707/101; 707/200; 707/202; 707/204; 707/100; 711/100
[58] Field of Search .................................. 707/200, 202, 707/204, 100, 101, 1

[56] References Cited

U.S. PATENT DOCUMENTS

| 5,222,235 | 6/1993 | Hintz et al. | 707/100 |
| 5,408,654 | 4/1995 | Barry | 707/101 |
| 5,412,805 | 5/1995 | Jordan et al. | 707/101 |
| 5,481,701 | 1/1996 | Chambers | 707/101 |
| 5,517,641 | 5/1996 | Barry et al. | 707/101 |
| 5,555,409 | 9/1996 | Leenstra et al. | 707/100 |
| 5,596,747 | 1/1997 | Katabami et al. | 707/101 |
| 5,625,817 | 4/1997 | Wood et al. | 707/101 |
| 5,721,915 | 2/1998 | Sockut et al. | 395/616 |

OTHER PUBLICATIONS

Boquoi, G.H.; Chan, F.M.; Horn, G.R.; Rodriguez, R.A.; "Table Object Location Linked List", IBM Technical Disclosure Bulletin, vol. 36, No. 5, May 1993, pp. 19–21.
Bulos, D., "How To Evaluate OLAP Servers", DBMS vol. 8, No. 9, p. 96, Aug. 1995, ISSN #1041–5173.
C. Baru, and D.C. Zilio, "Data Reorganization in Parallel Database Systems", Proceedings 1993 IEEE Workshop on Advances in Parallel and Distributed Systems, Oct. 6, 1993, ISBN# 8186 5250 0, pp. 102–107.
Stone, H.S., "Means for Dynamic Allocation of Sparse Tables", IBM Technical Disclosure Bulletin, vol. 32, No. 4A, Sept. 1989, pp. 214–216.

Primary Examiner—Thomas G. Black
Assistant Examiner—Jean M. Corrielus
Attorney, Agent, or Firm—Gates & Cooper

[57] ABSTRACT

The system, method, and program product of this invention allows a database management system to internally use direct and indirect pointing to locate targeted data elements that are logically related to another data element or are a target of a secondary index. By using direct and indirect pointing, the number of steps involved in a reorganization of the database can be reduced. After a reorganization, the database management system does not go back, in a separate process, to update all of the direct pointers that have pointed to segments that have moved as a result of the reorganization. Instead, the direct pointer is updated, by using the indirect pointer, only upon a first reference to the targeted data element that has moved. Each targeted data element has an entry in an indirect index where a unique identifier of the targeted data element is the key into the index. The indirect index has two direct pointer slots. Which pointer slot is used by the DBMS is determined by the odd/even reorganization number. For each reorganization, the DBMS alternates between the two portions of the indirect index to update the appropriate one of the two pointers with a new location whenever the targeted data element is moved. As a result, the indirect index contains the most recent update and the most recent previous update. If the reorganization fails, the most recent previous pointer is used to find the location of the targeted data element. Consequently, as the reorganization process is proceeding, the update to the assigned slot for the new reorganization number can be made without logging and without involving unnecessary overhead associated with maintaining direct recoverability of the keyed data records.

12 Claims, 6 Drawing Sheets

POINTER SET ~140

| 8 170 | 2 145 | 4 142 | 2 144 | 2 150 | 2 146 | 4 141 | 4 148 |
|---|---|---|---|---|---|---|---|
| TARGET SEGMENTS ILE KEY | FLEVEL | TARGET SEGMENT RBA | TARGET PARTITION ID | REORG NUM | UOR NUM | RBA OF TARGETS PARENT | LOCK ID OF TARGET |

INDIRECT LIST ENTRY ~180

| 8 187 | 2 183 | 2 185 | 4 182 | 2 184 | 2 150 | 2 186 | 4 181 | 4 188 |
|---|---|---|---|---|---|---|---|---|
| ILE KEY | SC & FLAG | FLEVEL | TARGET SEGMENT RBA | TARGET PARTITION ID | REORG NUM | UOR NUM | RBA OF TARGETS PARENT | LOCK ID OF TARGET | REPEAT ALL FIELDS AFTER SC |

SYSTEM, METHOD, AND PROGRAM FOR USING DUPLICATED DIRECT POINTER SETS IN KEYED DATABASE RECORDS TO ENHANCE DATA RECOVERABILITY WITHOUT LOGGING

CROSS REFERENCE TO RELATED APPLICATION

This application is related by common inventorship and subject matter to copending patent application Ser. No. 08/650,701 entitled "A System, Method, and Program For Using Direct and Indirect Pointers to Logically Related Hierarchical Data and Targets of Indexes" filed May 20, 1996, assigned to the Assignee hereof and entirely incorporated herein by this reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to database management systems, methods, and programs, and more specifically to the reorganization of hierarchical data involving data that is logically related and data that is the target of indexes, and even more specifically, to the recoverability without logging of information resulting from a failed reorganization.

2. Description of the Related Art

Periodically, databases need to be reorganized. Database performance can be maximized if logically related data is clustered together on the storage device. Clustering is intended to reduce disk traffic because a user often accesses logically related data in temporal proximity. However, as users add and delete data elements, the data can become disorganized such that logically related data is no longer clustered physically together.

For some databases, such as the full function database in IBM's IMS system referred to as IMS DL/I, at the time of database creation, a user can distribute free space throughout the data set. This provides for the fact that, typically, databases tend to grow. More data is added through usage than deleted. Distributed free space provides the ability to add logically related data elements throughout the data set while still being physically clustered together. However, typically, databases tend to grow unevenly. More logically related data may be added than what there is storage space for in certain areas. In order to find space for the data that should be clustered with existing data, the data is put out at the end of the data set. This is referred to as overflow which may require maximum arm movement on the DASD storage device to get to that data. As a result, data access performance time will suffer, the I/O access rate goes up, and response time goes up; perhaps to such a degree that this degraded performance becomes noticeable to a user. An user may become aware that the data is becoming disorganized.

A database can become disorganized to the point where a different organization of the data elements may result in more efficient operations on the data, more efficient use of data storage, and increased data capacity. The solution then is to perform a reorganization on the data. Reorganization of a database includes changing some aspect of the logical and/or physical arrangement of the database. Any database management system (DBMS) will require some type of reorganization in order to restore a given level of performance and to improve the degraded capacity of the database. One type of reorganization involves the restoration of clustering and removal of overflows as described above.

Another type of reorganization involves splitting up a full partition of data. Since a 32 bit relative byte address is limited to 4 gigabytes, when a database exceeds 4 gigabytes of data, it has to be partitioned into two or more physical data sets. When a partition is full, it has to undergo a reorganization to get more space.

However, during most types of reorganization, the area being reorganized is typically offline and unavailable to users. The duration of data unavailability for reorganization activities can sometimes be measured in weeks. It is undesirable to have the database go offline for significant periods. It is desirable to reduce the amount of time the database is unavailable by reducing the number of steps involved in a database reorganization operation, and more specifically, for reducing the number of steps involved in reorganizing a hierarchical database.

A hierarchical database management system, such as IBM's IMS DL/I, manages data in a tree structure. Each data element is called a segment, and the first data element is called the root segment of the structure. The root segment is the top of the tree and each subordinate segment is a child of the root or is a child of the child of the root segment or is a child somewhere further down the lineage, i.e., tree. One database is analogous to a forest containing a lot of trees all of which share the same defined segment structure.

IMS DL/I also has keyed access directly to any segment in the database. Every segment could be pointed to by an index. An index is similar to an index in a book that provides readers with one relatively quick means of locating a section of interest. An index is a listing that can derive the location of a desired element, eliminating the need for a "brute-force" sequential search through the collection of elements, thereby providing an alternative form of data access. For example, a root segment could be a serial number, part number, an account number, etc., and the first dependent segment of the root might be a name. An index on the name provides direct access to specific data without first knowing the identification of the root segment or segments that have dependent segments with a given name.

Indexing data by using direct pointers to, and between, data elements is common in databases managed by Database Management Systems (DBMS). It is well known that one can point indirectly to something through an index that can be pointed to directly. However, indexing data is usually the result of defining, by the users of such systems, either beforehand or dynamically, the data for which an index is used.

Another use of direct pointers is for secondary indices which is an index on the data other than its prime sequence which gives an alternate path to the data. Secondary indexing on hierarchical data, such as by users of IMS DL/I, is known. A secondary index is a keyed sequential data set (KSDS). For example, if an element (e.g., type of car) of a car manufacturer's database has different values (e.g., different colors), a secondary index by color can be defined that shows all the different types of cars that come in that color.

A further difficulty in managing hierarchical data is that logical relationships may exist between data elements in the same database or between specific data elements in different databases. For example, an employee database may have a relationship to a salary segment in a payroll database. Logical relationships in the data can be defined such that it is possible for an application program to easily find all employees with a given salary or to find the salary of all employees with the same name.

Direct pointing between segments in the same or different databases (in this case, the relative byte address within the data set(s)) is easily managed. This direct relative byte address is meaningful within the context of the definition for the data relationship. The definition of this relationship provides the mechanism for using a relative byte address (RBA) in the correct database data set to find the related data.

When data is moved, as would be done when a database is reorganized, all indexes and logically related segments that have direct relative byte pointing into the data being moved must be updated with the new or current relative byte address for the targeted data before the data can be used again.

Presently, it takes a significant amount of time, and multiple steps, to reorganize a database that consists of direct pointers to other data elements in the database since the direct pointers have to be updated after a reorganization. The database management system does not know in advance which data element the pointer is going to point to, so the database management system has to go back later and update the pointers after the reorganization. Reorganization of such a database is a multi step process and is very time consuming.

Even though a database having direct pointers creates a time consuming reorganization process, the actual execution time for a database having direct pointers is greatly enhanced. As such, there is a great need, by customers, to be able to use direct pointing to other data elements especially in hierarchical databases such as IBM's IMS DL/I system. Customers greatly desire the ability to express logical relationships between data elements by using direct pointers. Direct pointers give high execution performance.

However, as alluded to above, using direct pointers results in a multi-step reorganization process which causes the database to be gone through multiple times before the database is ready to be used after a reorganization. These multiple steps include 1) running a pre-reorganization utility that examines the structures and determines what has to be done, 2) running a scan utility for data that is not being reorganized but is related to data that is being reorganized, including a reload operation, and 3) running a prefix resolution utility and a prefix update utility.

More specifically, the pre-reorganization utility looks at the database definitions and makes a list of all data elements that are impacted by this planned reorganization of one or more databases. The necessary steps are then scheduled. To reorganize the database, the database is unloaded. The data is read in logical order and the data is collected, in effect, in a clustered format. As a result, when it is reloaded, it is a high speed operation to put the data back into the database in a clustered format with appropriate free space. Then, a work file is created having information about the old location and new location and other information of interest. In addition, scan utilities are run on one or more related databases which are not being reorganized but which are being pointed into or from the database being reorganized. The scan operation also creates work files. The work files are combined into a sort. The first sort is a prefix resolution where everything is sorted into old location. When all of the data elements are together from the old location, the new location can be added. Another sort sorts them into their physical location in the database where they are after the reorganization, and the pointer updates for the prefix are in the appropriate order for the database. This is the prefix update step. Prefix resolution runs as a sort exit, as well as prefix update so they are not separate steps. In each case, the entire database is gone through, multiple times, in order to achieve a reorganization. It is these multiple operations on the database that keeps the database unavailable for a longer period of time.

High speed reorganization techniques are known. However, these techniques have merely optimized some of the above utility steps and have not eliminated any of these steps nor have they altered the basic reorganization process as described above. The high speed reorganization techniques make the utilities run faster, such as through I/O techniques and parallel multi-tasking.

One way to avoid this multiple step reorganization process for direct pointers is not to use direct pointing, but rather use symbolic pointing. If symbolic pointing is used instead of direct pointing, then there is no need to go back and update the symbolic pointing after reorganization because the symbolic name does not change. However, symbolic pointing has low performance during execution time.

In a symbolic link to data, the data is referenced through its current index by using its symbolic name and using a hash table or index that points to the current value. As part of a reorganization, this is always recreated. As such, there is an ability to always relate to data elements regardless of a reorganization. The problem is that symbolic links have extra I/O access in order to go to the B tree, through the index, find the pointer, and finally get to the data. Symbolic pointing has a problem of being slow at execution time because of this extra I/O.

For direct pointing and symbolic pointing, there is a trade off between reorganization performance and execution time performance. Therefore, there is a need to use direct pointing for high database performance while not needing to go back and update the pointers after the reorganization.

One type of a reorganization, called a fuzzy reorganization, involves reorganization by copying. This type of reorganization involves a reorganizer (the process that performs a reorganization) that records a current relative byte address (RBA) of a log. An RBA is a position in the log where a log entry can be written. At any time, the "current" RBA of the log is the position where the next log entry is written. An RBA is sometimes called a log sequence number (LSN). A log consists of a sequence of entries in a file (a region of storage), recording the changes that occur to a database. Then the reorganization copies data from an old (original) area to a new area in reorganized form. Concurrently, users can use the DBMS's normal facilities to read and write the old area, and the DBMS uses its normal facilities to record the writing in a log. The reorganizer switches the user's accessing to the new area. In many DBMS's, however, each entry in the log identifies a record by the record's record identifier (RID). As an inherent part of reorganization, the RIDs change. When applying the log (which uses old RIDs) to the new area (which uses new RIDs) techniques for overcoming problems of identification have to be used.

One method for finding data moved by a reorganization process uses the fully concatenated key of the target of a logical relationship or secondary index. However, this method requires unique keyed data. A method is needed that allows non-unique and un-keyed data to exist in the database.

It is also desirable to reduce the contention between other parts of the system that are not being impacted by the reorganization directly, such as a secondary index. In general, when a database is being reorganized that has alternate, i.e., secondary, indexes associated with a data element being moved, at the time the data element is being moved from the old location to the new location, there is an ability to update all of the indexes. This is because they are known at that time, and the index that is indexing into that point is based on the data itself that is being moved, i.e., contained in effect within the database record. In general, the secondary index is based on data values in that data element. In the IMS DL/I database, the database element can be indexed either on a data value within that element or any element in its dependency tree. During reload, all of the information needed is available to directly update each secondary index at the time of reload. However, updating a secondary index at this time creates recoverability difficulties if a reorganization fails. These recoverability difficulties are reduced if the index is updated after the relocated data elements have been successfully completed.

It is desirable to provide for recoverability and data integrity, such as in the event a reorganization fails. Database techniques exist for data integrity and recoverability. For example, changes to a database can be logged; and changed records can be locked making them unavailable to users until the operation is successful, the records are verified to be valid, and the records are then unlocked. If there is a failure, and the operation does not complete, the changes are backed out and the records unlocked. It is desirable to reduce the system management overhead by eliminating the need of performing the steps of logging, locking, and backing out changes in the event of an operation failure.

SUMMARY OF THE INVENTION

It is an object of this invention to allow non-disruptive reorganization of user data managed by a database management system.

It is a further object of this invention to allow non-unique and unkeyed data to exist in a database while providing quick and direct access to targeted data.

It is a further object of this invention to eliminate the multiple steps in reorganizing a hierarchical database having direct pointers.

It is a further object of this invention to provide for recoverability and data integrity such as in the event a reorganization fails by reducing system management overhead incurred through logging, locking and backing out changes.

The system, method, and program product of this invention allows a hierarchical database having direct pointers to be reorganized without having to go back and update the direct pointers in a subsequent process. The invention determines when the pointers are still valid and can still be used, and when the direct pointers are not valid and can not be used. The invention also provides a mechanism to correct the invalid pointers on a first reference instead of having a separate process find the invalid pointers and correct them. In essence, the invention involves the capability to point directly and indirectly, a technique to recognize which one to use, and a technique to correct the pointers that are out of date as the pointers are used.

Two data elements that point to each other, such as with forward and backward chaining, can have one or both elements moved independent of the other. When data is moved that is a target of some related data element potentially existing outside of the physical storage boundaries containing the data to be moved, an Indirect List Entry (ILE), i.e., a locator file, associated with the target will exist and will be updated with the new location address for the targeted data at the time the targeted data is moved. When a direct pointer in a pointer set of the chained element is determined to be invalid, an indirect pointer is used to find a control element, i.e., the ILE, containing the new direct pointer. The chained element can be updated with the new direct pointer and the chained-to-element can then be located via the updated direct pointer.

A further refinement of this invention is in the assignment and management of the Indirect List Entries. In one embodiment, a table of indirect pointers can be managed. When an element is created that could be pointed to from outside, the (n)th entry in this table is permanently assigned to it. Storing the number (n) in the related element as its indirect pointer allows a method for finding data elements that have been moved. However, using a table in this manner is difficult, and managing the elements in one table for re-use could lead to performance degradation.

In a preferred embodiment, the solution for finding the ILE is to uniquely "name" each ILE occurrence and manage them by keyed access on the name.

As such, the preferred embodiment of this invention assigns a unique identifier (id) to every segment, i.e., data element, in the database at the time the segment is created, i.e., either at initial load when the database is first created or when the segment is added to the database through an update. The id is maintained for life across multiple reorganizations, i.e., the unique id does not change during a reorganization. Through the database definition for any given segment, it is known whether a segment is independent, i.e., whether it ever points outside of the database record or an outside database record points to it, i.e., whether it is a logically related segment, or whether it is a target of a secondary index. For such segments that can be pointed to, the unique id is used as a key of an index data set, i.e., a locator file.

Each such segment has a locator file, i.e., an indirect list entry (ILE), associated with it wherein the key to the locator file is the unique id of the segment. The locator file contains the new location and old location, i.e., the relative byte address (RBA), of the segment and its physical parent. By examining the database definition for any given segment, it can be determined whether the segment is involved in a logical relationship or is the target of a secondary index, and, therefore, whether the locator file for that segment should be maintained if the segment is moved.

Also, for every partition of the database, the database management system keeps a table in memory of the current reorganization number associated with each partition. Whenever a partition is reorganized, the reorganization number increases.

If a given segment points to a target segment, the given segment will have a pointer set associated with it having the pointer itself, a description of the partition of the database where the target exists to give a context, and a reorganization number to indicate the reorganization level of the target at the time the direct pointer is assigned. More specifically, the fields of the pointer set include a relative byte address of the target, the unique id of the target and the reorganization number. At actual execution time, the table in memory is used to verify whether a reorganization number in a pointer set matches the current reorganization number in the instorage table to indicate whether the direct pointer was valid and could be used. If the reorganization number matches the reorganization number in memory for that targeted partition, the RBA for the target in the pointer set is valid and can be used, i.e., the direct pointer in the pointer set can be used for direct reference. If the reorganization numbers do not match, this means that the target partition has been reorganized since the direct pointer has been last used so the direct pointer is out of date. Therefore, the RBA for the target in the pointer set is not valid and can not be used.

If the RBA for the target is not valid, i.e., the reorg number in the pointer set does not match the reorg number in memory for that target partition, then the current location of the target data element is resolved as follows. The unique id of the target segment in the pointer set will be used as a key into a locator file for that target segment. The locator file will maintain a current RBA location for the target segment which can be used to update the RBA location for the target in the pointer set. Once updated, and from this point on, until another reorganization which moves this segment, the pointer set referencing that segment will be correct and the direct pointer can be used for direct reference. The direct pointer is corrected only if it is used so machine time is not wasted if it is not in use, but yet the current location can always be found.

This invention is applicable not only to logically related hierarchical data, but also to data that is the target of a secondary index. In a partitioned database, i.e., a database that is broken up into a series of logically related records that can be operated on independently, a single partition can be reorganized while the rest of the database is available for use. Since the secondary index is organized on the value that is being indexed, the secondary index spans the entire database so that trying to update the index directly does not isolate changes to that part of the data set associated with the partition but would have impact on, data relating to other partitions. For performance reasons and for reducing contention, the secondary index also uses a pointer set to provide the capability to point directly, or to use the locator file to find a current location and to correct the index on reference. This allows the reorganization to be non-disruptive, i.e., not to affect the rest of the system.

As such, this invention allows non-disruptive reorganization of data by using a method of dual pointing with direct and indirect pointing to logically related data and data that is a target of secondary indexes. Direct and indirect pointing allows data element(s) to be relocated and stored in new physical location(s) without the need to immediately find and update the data elements that point to each moved data element. More specifically, this invention uses indexing within a Database Management System to improve data availability.

Another aspect of this invention lies in the structure of the locator file index, i.e., the indirect list entry. The locator file, manages the currency of the pointer set by using a reorg number which is incremented each time a reorganization takes place. In addition the locator file includes only that information which is necessary to avoid needless overhead. For example, the locator file simultaneously maintains both the old and new location of the target segment in order to reduce system overhead in managing the correct state of the data if a moved segment is backed out or not committed. The recoverability and performance of the index is improved because changes can be made to index records without logging of the changes.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

Figure 5:
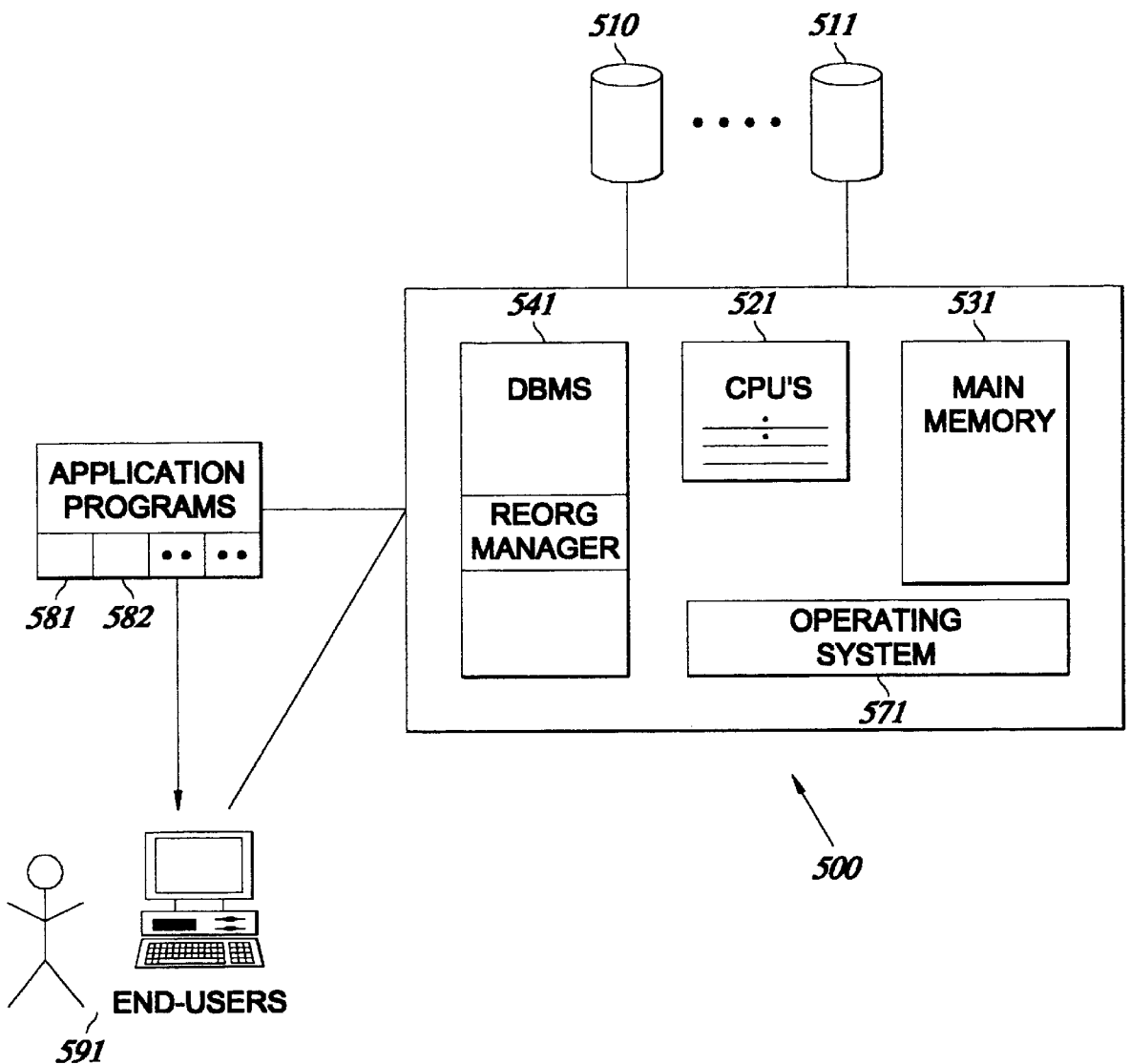
FIG. 5 shows the components of the system of this invention.

FIG. 5 shows the components of a database system including data, hardware, software, and users. Although FIG. 5 illustrates a single system, various components, e.g., the applications, end users, storage devices, processors, memory, etc., or multiple ones of any of the components could be interconnected in a network through a communications link. The system 500 allows multiple users 591 to access the database 510, 511 concurrently. A user can be an end user 591 who interacts with the system from an on-line workstation or terminal through an on-line application 582 or an interface provided by the DBMS 541, or an user can be a conventional batch application 581 sending requests to the DBMS. The data can reside in one database or multiple databases 510, 511. The hardware portions of the system consist of secondary storage volumes 510, 511, such as moving head magnetic disks, that are used to hold the stored data, together with the associated I/O devices, device controllers, I/O channels, etc., and processors 521 and associated main memory 531 that are used to support the execution of the database system software 541. Data structures and programs used by the database system software may reside in any of the many forms of memory including main memory, RAM, ROM, and physical external storage volumes. Between the physical database itself (i.e., the data as actually stored) and the users 591, 581, of the system is a layer of software, the database management system (DBMS) that runs on top of the operating system 571. All requests from users for access to the database are handled by the DBMS. The DBMS shields the database user from hardware-level details. The DBMS also contains software components that interact with the hardware components of the system to manage reorganizations and to manage the use of pointers as described hereinbelow.

The preferred embodiment of the present invention is used in conjunction with IBM's IMS DL/I database. However, the invention can be implemented in conjunction with other databases.

This invention involves a system, method and program product of dual pointing called direct and indirect pointing by using a pointer set that has a direct pointer that can be used when valid or by using an indirect pointer to a locator file when the direct pointer is not valid. This invention allows non-disruptive (i.e., other parts of the system remain unaffected) reorganization, of user data managed by a database management system by using internal indexing. There are benefits of a database management system using indexing internally by providing data availability and performance.

Direct pointing to targeted segments (data elements) in a database offers simplicity and performance advantages in and by itself. Finding and updating all segments everywhere in the data managed by a DBMS that point at data being relocated during reorganization is impractical even if it were feasible and available to the reorganization process.

Replacing simple pointing between related segments with a "pointer set" containing both a direct pointer and an indirect pointer requires this pointer set to contain a) qualification on the direct pointer to know when it is valid and can be used and when to use the indirect pointer to find the targeted data, and b) reorganization cursor qualification information to know whether the direct pointer or the indirect pointer should be used while the targeted data set is in the process of being reorganized.

Qualification on the direct pointer is accomplished by keeping a reorganization counter with the direct pointer. When data is moved, the reorg number for the data set containing that data is incremented and stored as system data within the data set. Pointer sets containing direct pointers into data that has been moved as a result of reorganization can compare the reorg number in the pointer set to the reorg number of the data set containing the targeted data and know the direct pointer may not be valid.

The reorganization cursor information must be on some logical data boundaries as opposed to physical relative byte addresses (RBA's). The logical boundary may take advantage of the data organization (e.g., one or more HDAM root anchor points or one or more root keys in a HIDAM database) but is not restricted to such boundaries.

Indirect pointing allows a target data element to have associated with it a third system managed data element that can be updated non-disruptively by a reorganization process. This leaves the data relationship usable with one level of indirect access after movement. The location of this indirect control element is unique and persists for the life of the specific occurrence of the related data.

Managing an array or table of indirect pointers within the data set of the targeted data can be one embodiment for accomplishing the goal of using indirect pointing. However, such an embodiment must consider how many array or table entries are necessary, how to assign new entries, how to re-use deleted entries, and basically how to manage this table without introducing contention hot spots in the data set during the reorganization process.

If the number of indirect table entries were allowed to be very large, e.g., a 64 bit binary number, re-use of table entries then is not a question if DASD space for all of the entries is not required in order to manage only the active entries. This is where keyed data, or indexing, is best used because only active keyed data is physically stored on DASD.

Therefore, in a preferred embodiment, indirect access to data that has been physically relocated is then done by using a very large table entry number as the key of a record in an index. This is an internally managed secondary index that provides a unique method of indirect pointing allowing data availability before, during, and after a non-disruptive reorganization process on the data.

More specifically, the invention is described with reference to FIGS. 1A, 1B, 1C, and 1D. DBY 110 and DBZ 160 are two different databases both having separate definitions. However, their definitions may allow a logical relationship to exist. For example, in databases where there is a concept of pairing, child 111 in database DBY 110 and Child 161 in database DBZ 160 are related. The logical parent 162 of child 111 may be the physical parent 162 of child 161. Likewise, the logical parent 112 of child 161 may be the physical parent 112 of child 111. An example of logical relationships is in a manufacturing bill of materials structure where the data elements 111 in database DBY 110 represent parts that make up a subassembly 112. The different instances of data elements 111, 112 may represent engineering change levels. The other database, DBZ 160, may be the vendors that supply the parts. The customer of the database defines the meaning and the semantics of the logical relationship. The database management system supplies the pointers, in accordance with the customer definitions, to make the database run fast.

In implementing direct pointing, for each segment, i.e., data element, there is a data portion 139 that the user sees, and a prefix 131 that consists of a series of pointers. One of the items is a logical pair pointer 133. By looking at the definition of the database, it can be determined where to go in the prefix 131 to get the direct pointer. The prefix is allocated in four (4) byte blocks, where each of the four byte blocks represents a relative byte address (RBA). The database definition describes what each block is. The pointer set 140 is a series of these blocks. If there is partitioning, the logical pair pointer 133 is expanded to indicate the partition id 144 as well as the relative byte address (RBA) 142 to indicate the data set in finding the logical pointer 133. The partition id 144 defines which data set the logical pointer is in, and the RBA 142 is the location within the data set. A data set is treated as if it is a continuous byte stream where every byte is not named, but if the physical location of the partition is known, then the byte location is known.

For the example as shown in FIGS. 1A, 1B, 1C, and 1D, it is assumed that data element 111 and data element 161 are related in such a way that the data portions are identical. The following describes features of the invention that overcomes the difficulties in managing these two logically related data elements. A pointer set 140 for data element 111 will have in it the partition id 144 of the target 161, the RBA 141 of the logical parent 162, the RBA 142 of the twin 161, the unique id 170 for the twin data element 161 and the reorg number 150 for that partition containing the data element 161. With the direct pointer set 140 for data element 111, a database management system can go directly from data element 111 to the twin data element 161 or the parent data element 162. The database management system will also have the unique id 170 of the twin 161 and a reorg number for that twin which is set to zero (0) initially.

Upon a reorganization to the partition in DBZ 160, there is a separate locator file 180, also referred to as an indirect list entry (see FIG. 3), where the unique id 170 of twin 161 is the key 187 to the locator file 180. In the locator file 180 for data segment 161, there is the RBA 181 of the physical parent 162 and the RBA 182 of the data segment 161. The locator file 180 is a special form of a symbolic because it does not go through a root via a concatenated key. It is a symbolic that goes directly into something. However, in this preferred embodiment, it is only usable for this process, it is not a general symbolic for other external programming use.

During operation, if the database management system (DBMS) reaches data element 111, as a result of the way a user formulated a call, etc., and wants to access the twin data segment 161, the DBMS looks at the partition id 144 for the twin data element 161 in the pointer set 140. The DBMS uses this partition id to look up in a table in memory a reorg number that is associated with that partition id. Each partition has its own reorg number. As each partition is reorganized, the reorg number associated with that partition is updated by incrementing it in the table in memory. When the database is opened, the reorg numbers are put into the table in memory. Whatever partition is being used, the current reorg number is available to the DBMS. The DBMS compares the reorg number in memory for that partition with the reorg number 150 in the pointer set 140.

If the reorg number 150 matches what is in memory, the DBMS can use the direct pointer 142 in the pointer set 140 to get to the twin data element 161. If the reorg number 150 in the pointer set 140 is incorrect or does not match, then the fields in the pointer set 140 have to be updated. The DBMS uses the unique id 170 in the pointer set 140 as a key 187 into the locator file 180 to get the RBA 181 of the physical parent 162 to update the pointer set 140. The DBMS puts the new RBA 181 from the locator file 180 as the RBA 141 of the logical parent in the pointer set 140. The DBMS also puts the RBA 182 of the twin data element's 161 own location as indicated in locator file 180 into the RBA 142 of the twin location in pointer set 140. The reorg number 150 is also updated.

As further shown in FIGS. 1A, 1B, 1C and 1D, within some databases, such as IMS DL/I, a user can define another secondary index database 190 which is a VSAM keyed sequential data set (KSDS) which has a specific index structure. For example, if a data element (car) has different values, i.e., comes in different colors, one can have a secondary index 190 by color that can show all of the cars that come in that color. This secondary index is a result of a user definition and can be defined symbolically or with pointers. If it is defined with direct pointers, a pointer set has to be added.

In a partitioned database, i.e., a database that is broken up into a series of logically related records that can be operated on independently, a single partition can be reorganized while the rest of the database is available for use. Since the secondary index is organized on the value being indexed, the secondary index spans the entire database. Trying to update the index directly does not isolate changes to that part of the data set associated with the partition but would have impact on data relating to other partitions. For performance reasons and for reducing contention, the secondary index also uses a pointer set to provide the capability to point directly to, or to use the locator file to find a current location. This reduces contention and corrects the index as it is being referenced which allows the reorganization to be non-disruptive, i.e., not to affect the rest of the system.

The locator file, as described above, is structured and formatted in a similar way as an index is structured and formatted. For clarification, an index database refers to one or more elements containing a key for the purpose of finding a pointer to some user data, and these keyed elements are managed in key sequence such as in an IBM VSAM KSDS. The same DBMS internal structure that manages secondary indexes is used to manage the locator file. Structuring the locator file in this way saves development cost, allows code reuse, and provides for other efficiencies, such as in managing it.

Indirect List Entry Keys (ILKs) and The Indirect List Entry

Figure 1:
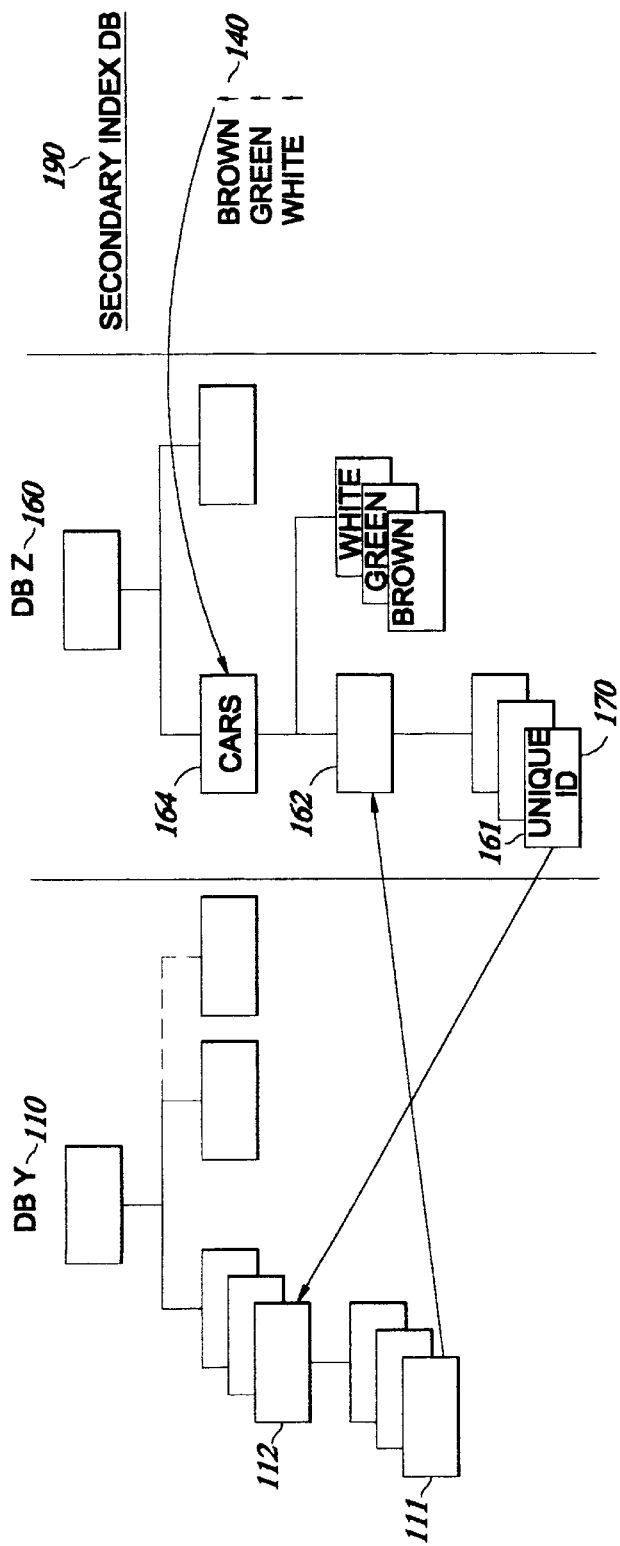
FIG. 1A shows logically and physically related database elements in two databases including a secondary index.
FIG. 1B shows a structure associated with a data element that is used for direct pointing.
FIG. 1C shows a pointer set within the structure of FIG. 1B.
FIG. 1D illustrates a locator file, i.e., an indirect list entry, that manages the currency of the pointer set by maintaining both the old and new location of a target segment.
Figure 2:
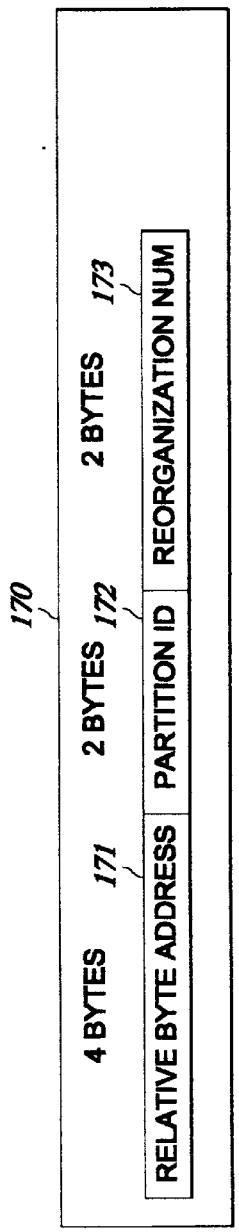
FIG. 2 shows the structure of an indirect list entry key.

An unique id 170 FIG. 1A, also referred to as an indirect list entry key (ILK) 170 FIG. 2, is created for each segment at the time each segment is created. There are at least two ways of doing this for each segment that is placed in the database. By the database definition for that segment it can be determined whether the segment is independent, i.e., it does not participate in a logical relationship by pointing to another segment or being pointed to by another segment or is not the subject of a secondary index. If it is not independent, i.e., it is dependent, it will require a locator file and a unique id should be created for it. If it is independent, then a unique id does not need to be created for it. However, this approach may require additional process steps. For example, at the time a database is defined, there may be three secondary indexes. After running for a while, it may be discovered that some applications may be able to improve their efficiency by the addition of a fourth secondary index. To do this, the database would have to be redefined to add the fourth secondary index by unloading (in effect a reorganization), reloading, and assigning the unique ids to existing segments that have now become a target.

To avoid the possibility of these additional steps, the preferred embodiment of this invention automatically assigns unique I.Q.S to each segment in a database, such as a DL/I database, as it is created. As a result, secondary indexes can be dynamically added without the additional management burden of going back and determining which segments would need a unique id. There are additional benefits, e.g., the ability to do logical recovery, etc., beyond the scope of the description of this invention, in assigning to each data element an associated unique id that never changes regardless of the number of times the data element is moved or reorganized.

As such, whenever a segment is added to the database, at initial creation, i.e., at initial load when the database is first created, or by a later update, that segment will have a unique id associated with it. It keeps the id for life across multiple reorganizations. The unique ids are never reused. If the segment is deleted, the unique id is lost forever.

The general format of the unique id (ILK) 170 discussed above is shown in FIG. 2. When a partitioned segment, such as a DL/I segment, is inserted, the ILK 170 is formed from the relative byte address (RBA) 171 of that segment, the current partition id 172, and the current partition reorg number 173. Partitioned DL/I relies on the use of an indirect list entry key (an ILK) 170 for various purposes as further described.

Figure 3:
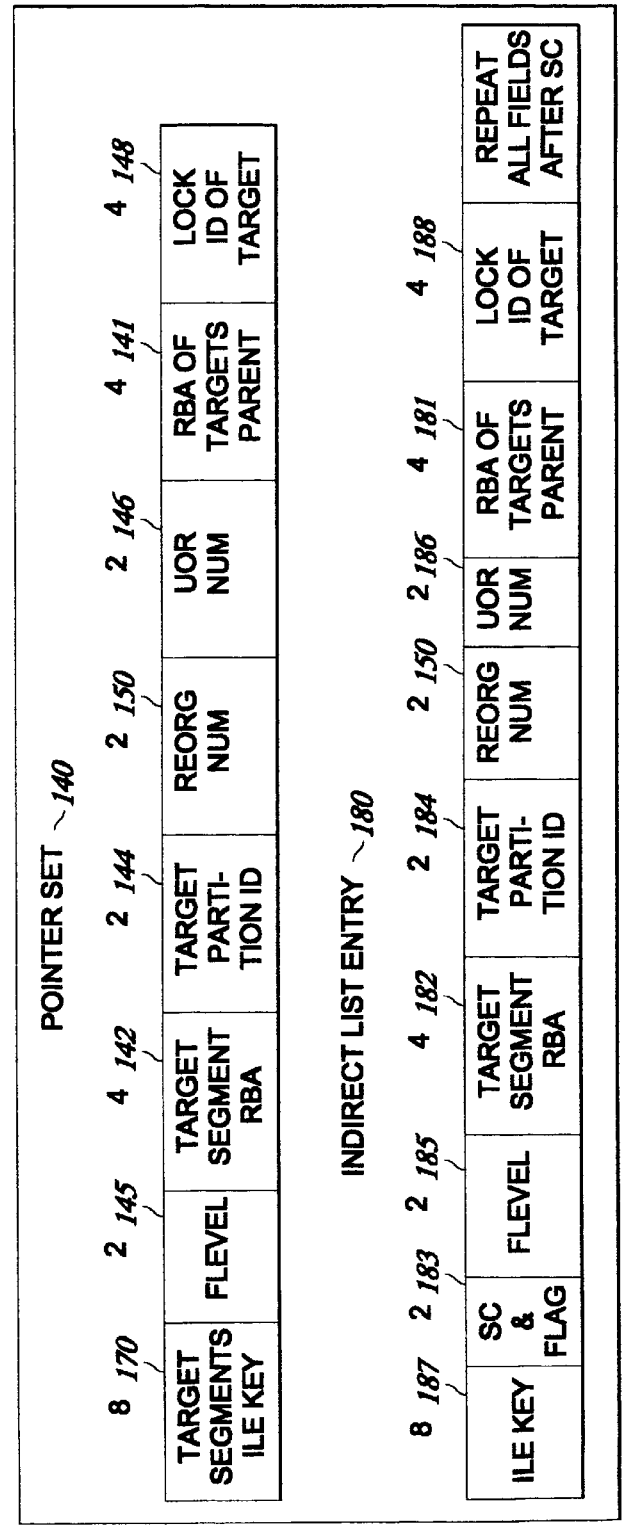
FIG. 3 shows the structure of a pointer set and an indirect list entry.

FIG. 3 illustrates the structure of the pointer set 140 and the indirect list entry, i.e., locator file 180. Indirect list entries (ILEs) 180 and pointer sets 140 are used to support logical relationships, which can span partitions, and secondary indexes which can also span partitions. The pointer set is an expanded pointer containing pointer information for both directly and indirectly locating a segment. The indirect list entry is an entity pointed to indirectly that always contains the pointer set information for locating a segment via direct relative byte addresses (RBA). Reviewing briefly the function of these elements, any segment which has the ability to point outside its own database record uses a pointer set 140, and the "pointed to" segment must have an entry in the ILE data set as the pointing mechanism. Consistent with this, any segment which is pointed to from outside the database record has an associated ILE 180, i.e., locator file, and contains the key of the ILE (ILK) 187 so that the ILE 180 may be updated when the segment is moved.

By examining the database definition for any given segment, it can be determined whether a segment is independent or not, i.e., whether or not it ever points outside of the database record or whether or not an outside database record points into it, i.e., whether or not it is a logically related segment, or whether it is a target of a secondary index. Therefore, by examining the database definition for that segment, it can be determined whether or not an ILE 180, i.e., a locator file, needs to be maintained for that segment and whether or not it will need to be updated if the segment is moved. When a pointed-to segment is initially inserted, the ILK 170 of that segment is placed in the pointer set 140 of the segment pointing to it. The same RBA 142/partition ID 144/reorg number 150 is also stored as the current direct pointer information to the pointed to segment. If the segment is not the target of a secondary index, or does not participate in a logical relationship, then the ILE 180 for that segment does not have to be affected. The reorganization is independent of it, though the segment still keeps its unique id. When the partition containing the pointed to segment is reorganized then the ILE (whose key is the original ILK) 180 is updated with the new and current location and other associated information to point to the moved target segment. In a later operation using a logical relationship or secondary index that points to the segment through a pointer set 140, it can be determined, by checking the reorg number 150, whether its pointer 140 is out of date, and can go to the locator file 180 to correct it.

Still referring to FIG. 3, the other fields in the pointer set 140 and indirect list entry 180 not described above are as follows. The "SC & FLAG" 183 is a one byte segment code containing the segment number definition, e.g., 01 for a root, and 02 for a child. The "FLEVEL" 145, 185 is the function level of the segment which provides for extensibility for future enhancements. The "UOR" 146, 186 is a unit of reorganization which is a reasonably sized logical portion of the data. The "lock id of target" 148, 188 is the lock name that is locked for this database record. The "repeat all fields after SC" just indicates that the indirect list entry extends further as discussed below in reference to FIG. 6.

A Preferred Embodiment of the Indirect List Entry Structure

Figure 6:
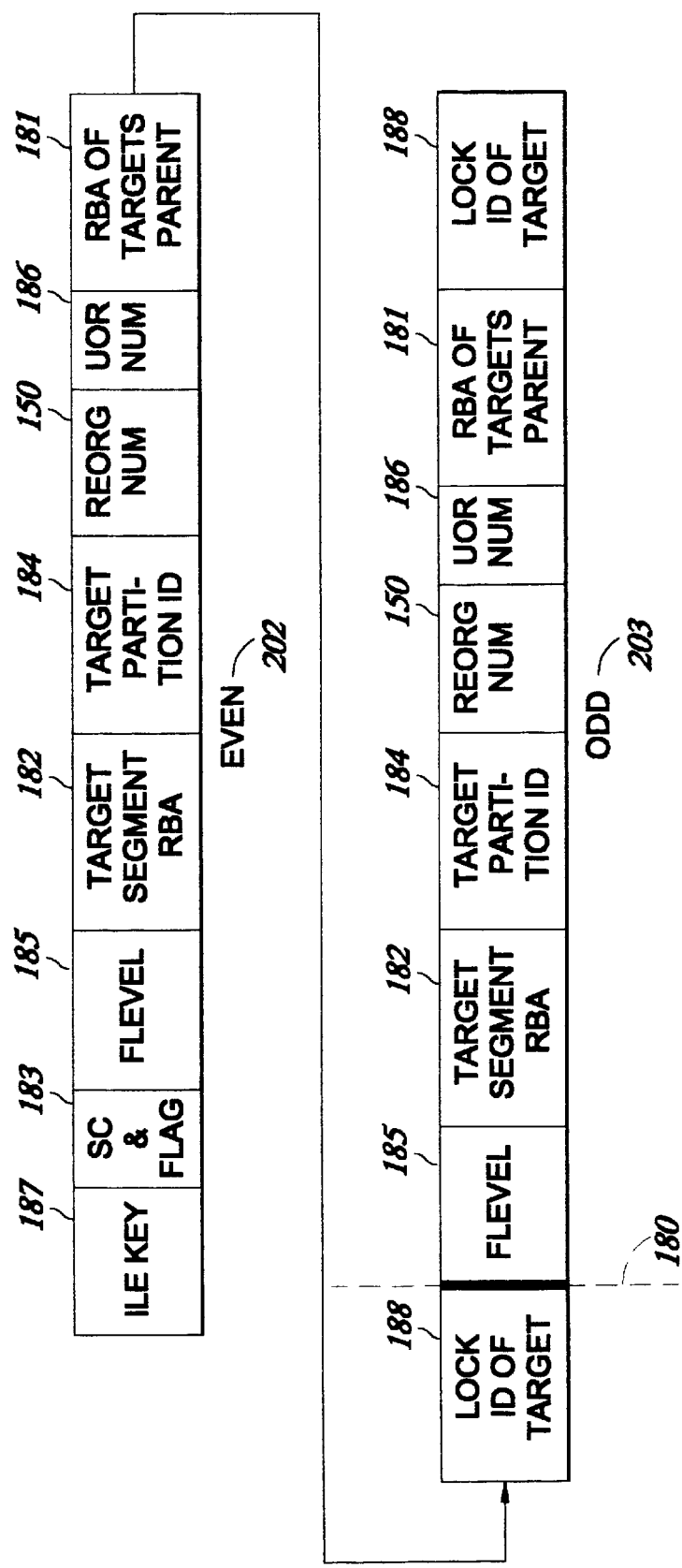
FIG. 6 shows the structure of the indirect list entry.

FIG. 6 illustrates a preferred embodiment of the structure of the indirect list entry 180 which illustrates another aspect of this invention for handling recoverability. When a reorganization is started on a partition, the indirect list entry 180 is updated with the new location 182. However, a reorganization is an atomic operation, i.e., if it fails to complete it is as if it never happened. Nevertheless, the indirect list entry 180 would have been updated. Consequently, the indirect list entry 180 will not be correct. It will not reflect the real location of the data at this point. It is undesirable to have to log all of the changes to the locator file in order to back out the changes in the event of a reorganization failure.

The specific structure of the locator file in a computer usable medium accessible by the database manager allows the data set for the new location of the segment to be discarded, and updates to the ILE started over with, without any additional system overhead if the reorganization process fails.

Duplicate direct pointers are maintained in the indirect keyed data record, i.e., the ILE. The keyed data record itself has two direct pointer slots. Which pointer slot is used is determined by the odd/even reorganization number. As the reorganization process proceeds, the update to the assigned slot for the new reorganization number can be made without logging and without involving unnecessary overhead associated with maintaining direct recoverability of the keyed data records. This assumes the restart and recovery of data reorganization is managed on some logical/physical boundaries of the targeted data. A further assumption involves the physical recovery of the particular keyed data. That is, the keyed data set is rebuilt from a pass through of the targeted data instead of employing change logging and recovering from logged changes.

As such, to insure recoverability and data integrity, the indirect list entry 180 has two different location fields, the even set 202 and the odd set 203. If there is a reorganization where the reorganization number changes from odd (even) to even (odd), and the new reorganization number is even (odd), each new location will be stored in the even (odd) half. The indirect list entry 180 is always maintaining the current location and the most recent previous location. By flip flopping within the indirect list entry 180, the newest recorded location can be found or the most recent previous location.

The reorganization number for each partition stored in a table in memory, which is also the same reorganization number 150 stored in the new location half of the indirect list entry, is an external monatomically increasing (increasing in one unit increments such that each sequential number alters between being odd or even) number. This provides the database management system the ability to determine which even or odd half of the indirect list entry to use as the current targeted segment location. If the current reorganization number is odd, but this reorganization has failed, the database management system goes to the location stored in the even half. For a subsequent reorganization, the database management system will store the new location in the odd half. For a following reorganization, the database management system will flip over to the even half and store the new values there. The database management system flip flops between halves with each reorganization, i.e., as the external number monatomically increases. As such, old (i.e., most recent previous) values and new (i.e., newly changed) values are combined into a single file having separate portions, i.e., halves, for each, and is managed on a flip flop basis as an external number increases.

An alternative approach would be to allocate a second indirect list entry and temporarily save it. However, with both new and old locations stored within the same indirect list entry, there is no need to create a new indirect list entry and incur system management overhead in managing it.

In the preferred embodiment, there is no need to perform any logging, locking, or backing out of any changes to the indirect list entry. There is also no need to allocate an additional temporary indirect list entry to record changes. Typically, for users currently opened against the partition, they would not only have to reallocate the data set to the reorganized data set, but they would also have to reallocate the indirect list entry. In the preferred embodiment of this invention, all of the system management overhead that is used for those steps is saved. If the reorganization fails, the database management system utilizes that part of the indirect list entry containing old values which have not been altered. The invention has maximum data integrity with minimum system management overhead and minimum execution overhead. If the indirect list entry data set is lost, it can be recreated by scanning the database on the fly.

Method of Operation

Figure 4A:
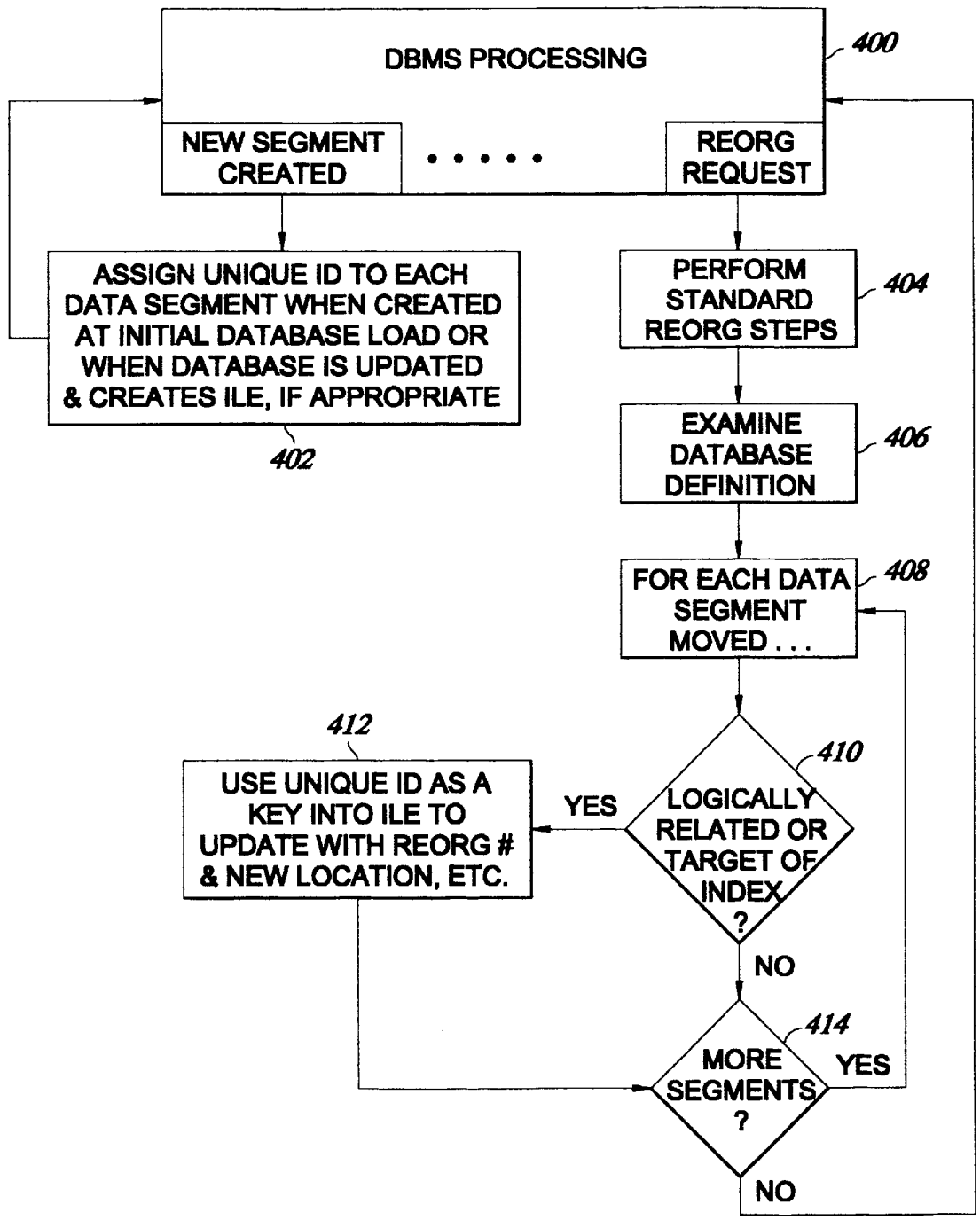
FIG. 4A shows the overall method steps, including a high level description of the program steps, in assigning unique ids to data segments and in updating an indirect list entry during a reorganization.
Figure 4B:
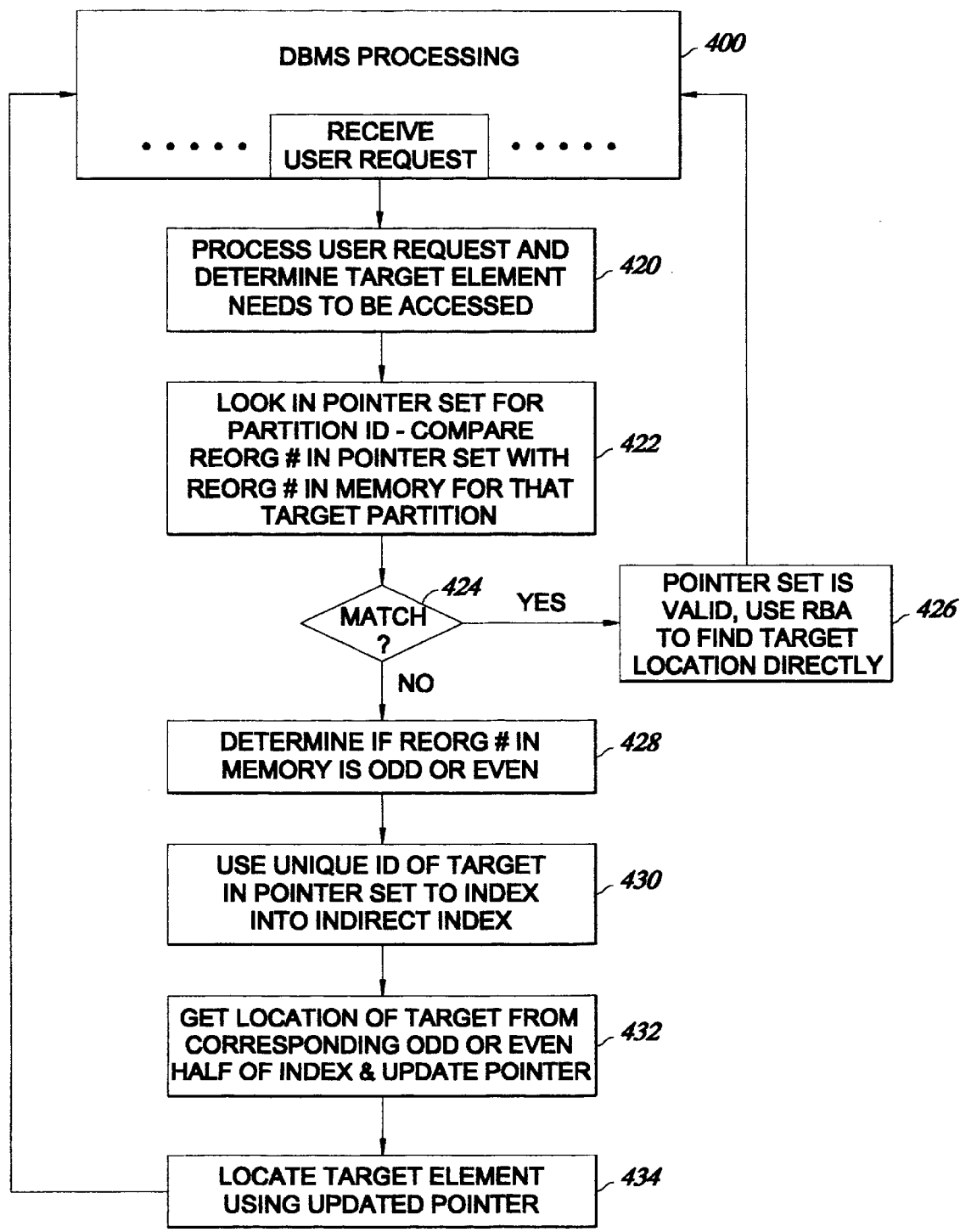
FIG. 4B shows the overall method steps, including a high level description of the program steps, in using direct and indirect pointing to find a target data segment.

FIGS. 4A and 4B shows the overall method steps, including a high level description of the program steps, of using direct and indirect pointers by a database management system for logically related data and data that is a target of a secondary index.

Step 400 indicates that the DBMS performs its usual processing as events or requests are received. Referring to FIG. 4A, at step 402, whenever a segment is added to the database, at initial database creation or by a later update to the database, that segment will be assigned a unique id. When a database is initially created, nothing, by definition points into it. An indirect list entry is created for a segment when it is added to a database, initially or during an update, if the segment is defined as a target of a index or participates in a logical relationship. The initial file would be considered at reorg number zero, i.e., just created and never reorganized. Therefore, the reorg number for the partition and for all pointer sets would be zero. The next event involves a reorganization of a partition. A reorganization is a logical read of the existing data so that one can recluster and eliminate overflow to get all of the data back close together.

The standard steps 404 in a reorganization include: reading the data in its logical order, i.e., an order having a desired cluster, recreating the data set with the maximum clustering for performance reasons, reestablishing distributed free space for performance reasons, reestablishing distributed free space for growth, and establishing overflow areas so the database can grow. Some databases that have a requirement of partitions, such as IMS DL/I, have additional reorganization responsibilities to take partitions that are full and to break them into two partitions to gain more space.

In addition to these standard reorganization techniques, the following steps 406, 408, 410, 412, 414, occur. When the data segment is placed in the new data set it will have a new relative byte address. When reorganized, at the time a segment is put in its new location, if the segment is the target of a secondary index or participates in a logical relationship, a unique identity is used as a key into the indirect list entry so that all of the information as to where the segment is now can be added to the indirect list entry.

Referring to FIG. 4B, the DBMS continues its processing, step 400. If a user request comes in that requires a target element to be accessed, step 420, the DBMS will look into the pointer set of the segment that points to the target to find the partition id of the targeted segment, step 422. The DBMS will use this partition id to look up into memory the reorg number associated with that partition id, and will compare the reorg number in memory with the reorg number in the pointer set. If the reorg numbers match, step 424, then the pointer set is valid and the DBMS can use the RBA in the pointer set to find the target segment directly, step 426. If a reorganization has taken place, all data elements, whether in the same partition, or any other partition or any other database that points to this moved targeted segment, has the old reorg number in their pointer set. An attempt to follow the direct pointer will fail the reorg number check, steps 422, 424. The pointer set would show a reorg number set at zero, but, in this example, this reorganization has the value of one. The unique id is used to go to the indirect list entry, step 430 to pull out the current information, and to update the information in the pointer set, step 432. In a preferred embodiment, the DBMS determines whether the reorg number in memory is odd or even, step 428, and then gets the target location from the corresponding odd or even half of the indirect list entry to update the pointer, step 432. The target element is then located using the updated pointer, step 434. In other words, when an instance of targeted data has been moved by a reorganization process, the indirect pointer is used to find a keyed data record which contains an updated direct pointer. All future uses, prior to another reorganization on this partition, would be direct without having to go to this indirect list entry. The overhead of correcting the pointer is paid only once when it is used. The whole database does not have to be scanned. Once the correct value is determined, it is saved for all future use.

Using the foregoing specification, the invention may be implemented using standard programming and/or engineering techniques using computer programming software, firmware, hardware or any combination or subcombination thereof. Any such resulting program(s), having computer readable program code means, may be embodied within one or more computer usable media such as fixed (hard) drives, disk, diskettes, optical disks, magnetic tape, semiconductor memories such as ROM, Proms, etc., or any memory or transmitting device, thereby making a computer program product, i.e., an article of manufacture, according to the invention. The article of manufacture containing the computer programming code may be made, used and/or sold by executing the code directly from one medium, by copying the code from one medium to another medium, by transmitting the code over a network, or by distributing the medium containing the code.

An apparatus for making, using, or selling the invention may be one or more processing systems including, but not limited to, cpu, memory, storage devices, communication links, communication devices, servers, I/O devices, or any subcomponents or individual parts of one or more processing systems, including software, firmware, hardware or any combination or subcombination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention. While the preferred embodiment of the present invention has been illustrated in detail, it should be apparent that modifications and adaptations to that embodiment may occur to one skilled in the art without departing from the spirit or scope of the present invention as set forth in the following claims. For example, although the invention has been described with reference to hierarchical databases having logically related data elements, the invention could be applicable to other databases where one element can be pointed to by another element.

We claim:

1. A database system for reorganizing a database having at least one related data element related to a targeted data element, the database system comprising:

means for relocating to a new physical storage location the targeted data element independently of updating a direct pointer associated with the related data element to indicate a location of the targeted data element;

an indirect index having a unique indirect list entry key associated with two direct pointers; the first pointer containing information relating to a relocation to the new physical storage location as a result of a most recent reorganization; and the second pointer for containing previous information relating to a previous relocation to a previous storage location resulting from a previous reorganization;

means for updating the indirect index with the new physical storage location of the targeted data element when the targeted data element is relocated; and means for updating, using the updated indirect index, the direct pointer at a first reference of the targeted data element after the targeted data element is relocated.

2. The database system of claim 1 wherein the means for updating the direct pointer further comprises means for using the second pointer in the indirect index if the relocation to the new physical storage location as the result of the most recent reorganization is backed out or not committed.

3. A database system, having at least one data element, comprising:

means for maintaining a reorganization number representing an update state of the data element wherein each subsequent update state is alternatingly associated with an odd or even reorganization number;

a data record having a keyed entry for at least each data element that is dependent, each keyed entry having duplicate direct pointers, a first direct pointer associated with the odd reorganization number and a second direct pointer associated with the even reorganization number, for pointing to a location of the data element;

means for determining whether to update the first direct pointer or the second direct pointer during a current reorganization depending upon whether the current reorganization number is odd or even;

updating the entry of the data record independently of logging the update in a separate record, whereby the entry contains, after an update, a current location and a most recent previous location;

accessing the first direct pointer for a current location of the data element if the current reorganization number is even and a current reorganization fails; and accessing the second direct pointer for the current location of the data element if the current reorganization number is odd and the current reorganization fails.

4. A computer system comprising:

means for monatomically incrementing a number stored in memory representing an update state wherein each subsequent update state is alternatingly associated with an odd or even number;

a data structure in memory having two sets of fields for storing a most recently updated set of information and a previously updated set of information wherein a first set of fields, in a first part of the data structure, is associated with an odd number update and a second set of fields, in a second part of the data structure is associated with an even number update; and means for accessing the first and second parts of the data structure in an alternating manner, dependent upon whether a current update state is associated with the odd or even number, during subsequent updates to information in the data structure.

5. The computer system of claim 4 further comprising means for accessing the second set of fields having previously updated set of information if the current update state is associated with an odd number and the current update state fails to complete.

6. The computer system of claim 4 further comprising means for accessing the first set of fields having the previously updated set of information if the current update state is associated with an even number and the current update state fails to complete.

7. A method of reorganizing a database having at least one related data element related to a targeted data element, the method comprising:

relocating to a new physical storage location the targeted data element independently of updating a direct pointer associated with the related data element to indicate a location of the targeted data element;

updating, in an alternating fashion, an indirect index with the new physical storage location of the targeted data element when the targeted data element is relocated, the indirect index having a unique indirect list entry key associated with two direct pointers; the first pointer containing information relating to a relocation to the new physical storage location as a result of a most recent reorganization; and the second pointer for containing previous information relating to a previous relocation to a previous storage location resulting from a previous reorganization; and updating, using the updated indirect index, the direct pointer at a first reference of the targeted data element after the targeted data element is relocated.

8. The method of claim 7 wherein the step for updating the direct pointer further comprises using the second pointer in the indirect index if the relocation to the new physical storage location as the result of the most recent reorganization is backed out or not committed.

9. A method for use in a database system, the method comprising:

monatomically incrementing a number stored in memory representing an update state wherein each subsequent update state is alternatingly associated with an odd or even number; and accessing, in an alternating manner, each one of two sets of fields of a data structure in memory for storing a most recently updated set of information and a previously updated set of information wherein a first set of fields, in a first part of the data structure, is associated with an odd number update and a second set of fields, in a second part of the data structure is associated with an even number update;

whereby the first and second parts of the data structure are accessed in an alternating manner dependent upon whether a current update state is associated with the odd or even number, during subsequent updates to information in the data structure.

10. A memory, for use with a database management system, for accessing a targeted data element from a related data segment, the memory comprising:

a direct pointer data structure comprising:

a first reorganization number indicating a reorganization level of a partition containing the targeted data element;

a relative byte address of a first location of the targeted data element associated with the first reorganization number;

a unique segment identifier of the targeted data element;

an indirect index data structure having the unique segment identifier as a key into the indirect index data structure comprising:

duplicated fields wherein a first set of fields is associated with an even reorganization number and a second set of fields is associated with an odd reorganization number, the first and second fields each containing:

the even or odd reorganization number indicating the reorganization level of the partition containing the targeted data element; and a relative byte address of a second location of the targeted data element associated with the reorganization level indicated by the even or odd reorganization number;

whereby the indirect index has a most recent location of the targeted data element and a most recent previous location of the targeted data element.

11. A program product, for use with a database system having at least one related data element related to a targeted data element, the program product having program code, on a computer usable medium, comprising:

means for causing a determination that the targeted data element needs to be accessed from the related data element;

means for causing a use of a direct pointer data structure, associated with the related data element, having a first location of the targeted data element, a partition identifier of the targeted data element, and a first reorganization number associated with the location of the targeted data element for comparing the first reorganization number to a second reorganization number in memory for the targeted data element;

means for causing a use of the first location to locate the targeted data element if the first reorganization number and the second reorganization number are the same; and means for causing a use of an indirect index data structure, by using the partition identifier as a key into the indirect data structure, the indirect index data structure having an odd and even portion reflecting the odd or even nature of the second reorganization number, the indirect index being updated with a newer location of the targeted data element in a portion associated with the odd or even nature of a latest reorganization number when the targeted data element is moved, to locate the targeted data element by using the newer location in the portion of the indirect index associated with the odd or even nature of the second reorganization number, if the first and second reorganization number are different.

12. A program product, for use with a database system, the program product having program code, on a computer usable medium, comprising:

means for causing a monatomical increment of a number stored in memory representing an update state wherein each subsequent update state is alternatingly associated with an odd or even number; and means for causing an access, in an alternating manner, each one of two sets of fields of a data structure in memory for storing a most recently updated set of information and a previously updated set of information wherein a first set of fields, in a first part of the data structure, is associated with an odd number update and a second set of fields, in a second part of the data structure is associated with an even number update;

whereby the first and second parts of the data structure are accessed in an alternating manner dependent upon whether a current update state is associated with the odd or even number, during subsequent updates to information in the data structure.

\* \* \* \* \*

UNITED STATES PATENT AND TRADEMARK OFFICE
CERTIFICATE OF CORRECTION

PATENT NO. : 5,881,379
DATED : March 9, 1999
INVENTOR(S) : Beier et al.

It is certified that error appears in the above-identified patent and that said Letters Patent is hereby corrected as shown below:

<u>Title page,</u>
Item [*] Notice: This patent is subject to a terminal disclaimer.
Item [56], References Cited, OTHER PUBLICATIONS, "Boquoi" should read
-- Buquoi --.

Signed and Sealed this

Sixth Day of August, 2002

*Attest:*

*Attesting Officer*

JAMES E. ROGAN
*Director of the United States Patent and Trademark Office*